(12) United States Patent
Vidkjaer

(10) Patent No.: US 6,733,803 B1
(45) Date of Patent: May 11, 2004

(54) DOUGH CONTAINING, VALVED PACKAGE

(75) Inventor: Karsten Vidkjaer, Hoejbjerg (DK)

(73) Assignee: Nestec S.A., Vevey (CH)

( * ) Notice: Subject to any disclaimer, the term of this patent is extended or adjusted under 35 U.S.C. 154(b) by 1,826 days.

(21) Appl. No.: 08/404,676

(22) Filed: Mar. 15, 1995

(30) Foreign Application Priority Data

Mar. 16, 1994 (EP) .............................. 94104044

(51) Int. Cl.⁷ .................. B65D 81/20; B65D 81/00; B65D 85/00
(52) U.S. Cl. .................. 426/62; 426/118; 426/128
(58) Field of Search .................. 426/118, 128, 426/62

(56) References Cited

U.S. PATENT DOCUMENTS

| | | | | |
|---|---|---|---|---|
| 1,411,223 A | * | 3/1922 | Retzbach | 426/128 |
| 1,811,772 A | * | 6/1931 | Willoughby | 426/118 |
| 1,857,015 A | * | 5/1932 | Gere | 426/118 |
| 1,861,124 A | * | 5/1932 | Lorber | 426/128 |
| 1,904,741 A | * | 4/1933 | Lorber | 426/128 |
| 2,638,263 A | * | 5/1953 | Jesnig | 426/118 |
| 2,986,319 A | * | 5/1961 | Bierman et al. | 426/118 |
| 3,649,304 A | * | 3/1972 | Fehr et al. | 426/128 |
| 3,799,427 A | * | 3/1974 | Goglio | 383/103 |
| 3,879,563 A | * | 4/1975 | Tucker et al. | 426/128 |
| 3,949,934 A | * | 4/1976 | Goglio | 426/113 |
| 4,120,984 A | * | 10/1978 | Richardson et al. | 426/128 |
| 4,134,535 A | * | 1/1979 | Barthels et al. | 383/103 |
| 4,206,870 A | * | 6/1980 | DeVries | 426/118 |
| 4,381,315 A | * | 4/1983 | Yong et al. | 426/128 |
| 4,415,598 A | * | 11/1983 | Chen et al. | 426/118 |
| 4,444,219 A | * | 4/1984 | Hollenstein | 383/103 |
| 4,590,078 A | * | 5/1986 | Umina | 426/128 |
| 4,741,907 A | * | 5/1988 | Furuhashi | 426/128 |
| 5,084,284 A | * | 1/1992 | McDilda et al. | 426/128 |
| 5,314,702 A | * | 5/1994 | Lewandowski et al. | 426/128 |
| 5,354,133 A | * | 10/1994 | Rapparini | 383/103 |
| 5,366,744 A | * | 11/1994 | Drummond et al. | 426/128 |
| 5,409,720 A | * | 4/1995 | Kent et al. | 426/128 |
| 5,547,694 A | * | 8/1996 | Perry et al. | 426/128 |
| 5,776,526 A | | 7/1998 | Baensch et al. | 426/62 |

FOREIGN PATENT DOCUMENTS

| | | | | |
|---|---|---|---|---|
| CA | 499837 | * | 2/1954 | 426/128 |
| CA | 1268076 | | 4/1990 | |
| DE | 4209694 | | 9/1993 | |
| EP | 158590 | | 10/1985 | |
| EP | 332885 | | 9/1989 | |
| EP | 373 833 A3 | | 10/1990 | |
| EP | 487878 | | 9/1992 | |
| FR | 2833806 | * | 10/1982 | 426/128 |
| NL | 8105828 | * | 7/1983 | 426/128 |
| WO | WO93/01724 | | 2/1993 | |

OTHER PUBLICATIONS

Patent Abstracts vol. 17, No. 496 (C–1108) Sep. 8, 1993 & JP–A–05 130 825 (SOOI) May 28, 1993—Abstract.
*Packaging,* Jun. 1963, "S.I.G. Vacuum/Gas Packaging Plant for Coffee".

* cited by examiner

*Primary Examiner*—Steve Weinstein
(74) *Attorney, Agent, or Firm*—Winston & Strawn LLP

(57) ABSTRACT

The invention relates to an combination (1) containing a dough to be kept under refrigeration and including a packaging system (2, 7) provided with a one-way valve (8), a dough (4) based on living yeast inside said packaging and a substantially oxygen free atmosphere surrounding the dough.

8 Claims, 5 Drawing Sheets

DOUGH CONTAINING, VALVED PACKAGE

TECHNICAL FIELD

The invention relates to a combination containing a dough to be kept under refrigeration in a package and a process for its preparation.

BACKGROUND ART

WO 93/01724 patent application concerns already a process for preparing a yeast-leavened dough capable of being stored at refrigeration temperatures. This dough is prepared by mixing flour, water and yeast, packaging said dough in a container, which is a spirally wound composite can, sealing the container, proofing said dough in said container and storing said product at refrigeration temperatures.

The problem at the base of this patent is that during the storage, the yeasts which are used continue to grow and produce carbon dioxide. Then, after a period of storage of several weeks, the internal pressure in the container can be so high, that the container could explode. The reason of this pressure increase is the fact that for preparing the dough, they must make a proofing of the dough: when the yeasts has been highly activated for the step of proofing the dough, it is problematic to simply inactivate these yeasts by subjecting the obtained dough to a refrigeration temperature. In fact, these yeasts will probably not stop producing gas immediately by refrigeration,because their metabolism has been induced to produce much gas.

U.S. Pat. No. 1,904,741 concerns a packaging containing a dough prepared from a yeast. This packaging allows the dough to expand, but does not have a controlled atmosphere, so that it is not possible to have this dough stored for several weeks.

SUMMARY OF THE INVENTION

The present invention provides the possibility of delivering to the consumer an assembly containing a yeast-based dough, wherein the dough has been prepared and packed without any proofing a step.

The invention specifically concerns a combination of a dough product based on living yeast which generates gas over time, a closed packaging system for containing said dough product, the packaging system comprising a housing of a material which is essentially impervious to oxygen, valve means operatively associated with the housing for allowing exit of gas from the housing when the gas pressure exceeds a certain minimum value and which closes when said gas pressure drops below the minimum value to prevent entry of oxygen into the housing and a substantially oxygen-free atmosphere surrounding the dough.

The valve means used is called a one-way valve.

Under living yeast, we understand a yeast containing microorganisms which are still living during the storage.

Under refrigeration, we understand a dough to be kept at a temperature of below 12° C., more particularly between 2 and 8° C. The freezing point of the dough being under 0° C., it is possible to keep this dough frozen at −18° C. for at least 2 months.

According to the present invention, the dough does not have to be proofed and during the storage ,the dough is quickly saturated with gas, which allows to directly bake it without any proofing step. In fact, the presence of gas in the dough is sufficient to get the desired raising effect when the dough is baked.

The possible storage duration is of at least 4 weeks at 8° C. and at least 3 weeks at 12° C.

During storage at chilled temperature, as specified above, there is carbon dioxide also accumulating in the head space of the packaging. The presence on the packaging of the one-way valve will allow this carbon dioxide to escape from said packaging, however, so that only a small over pressure will build up internally. The overall quality of the dough is improved thanks to the release of the extra gas and other excess volatile compounds.

The small residual activity of the baker's yeast during chilled storage has another important positive influence on the dough quality. It supplies at a constant slow rate precursor molecules that can develop the desired bread flavour upon baking of the dough. Since these flavour precursor molecules are unstable they cannot be produced in a single proofing step at ,the& beginning of the storage period as proposed by patent application WO 93/01724.

The type of the one-way valve which is used is not critical: we can use any valve on the market, for example from the Goglio type or the Raackmann type. The Goglio-type valve comprises valves from the company Bosch, Wipf and Wico. Both these types of valves will be explained in reference with FIGS. 4 and 5.

The advantage of the combination according to the invention is to make possible to use a more flexible packaging system and not a can as for the above mentioned WO patent application No. 93/01724.

The packaging system can be thermoformed or of the flow pack type. The material which is used is not critical. The important is that this material has a gas barrier property, to be sure that no oxygen enters the system.

In the case of thermoforming, we can use a base web (housing) which has to be thermoformed. We use for example the following composite sheets: A-PET/PE (amorphous polyester/polyethylene), PP/EVOH/PE (polypropylene/ethylene-vinyl alcohol copolymer/polyethylene) or PVC/PE (polyvinyl chloride/polyethylene).

This base web is more or less rigid, with a thickness comprised between 200 and 1000 microns. The top web has afterwards to be sealed on the thermoformed base web. This latter web, forming the cover for the package must have gas barrier and be heat stable. The material used can be chosen among the following materials: PA/PE(polyamide/polyethylene), OPA/PE (oriented polyamide/polyethylene) PET/PE (polyester/polyethylene) or OPP/PE (oriented polypropylene/polyethylene) which can have gas barriers in types of for example PVDC (polyvinylidene chloride), EVOH, metal or mineral layer. The thickness of the top web is comprised between 50 and 200 microns. Polyethylene has been chosen normally but any sealant which will give a sufficient adhesion between top and base web can be used.

In the case of a flow pack system, there is no obligation of rigidity. The material used is chosen among those which can be used as top webs in thermoforming. As for thermoforming we must use materials having gas barrier properties. The flow pack technique is described in "L' Emballage sous toutes ses facettes", 1988, Chapter 32.

The one-way valve is placed, in the case of thermoforming, on the top web, either on the inside or on the outside of the packaging, but preferably on the inside, to avoid therefore any risk of tearing said valve away.

In the case of a flow pack system, the one-way valve is disposed as on the top web of the thermoformed assembly.

The yeast can be of any type used in the bakery area. It is generally prefered that the species be the *Saccharomyces* genus. One particularly preferred species is *S. Cerevisiae*.

The preferred baker's yeast strains are of the lti (Low Temperature Inactive) type, for example those which are the object of European Patent Application 0487878 or most preferentially those described in a European Patent application filed by the same applicant :under the title "Levure de boulangerie industrielle inactive au froid" (No. 94104043.8). The lti baker's yeast strains unify a very good characteristics in industrial cell mass production and drying with a very low gassing activity in refrigerated dough products up to 12° C.

Yeast can be either in the fresh or dry form. In this latter case, the yeast has to be rehydrated just before use. The dough contains between 0.01 and 1% of yeast based on dry matter. In this specification, all the percentages are in weight.

The dough is obtained by mixing yeast, water, flour and other ingredients such as salt, sugars, oils or fats. In general, the dough is prepared for bakery products such as pizza, bread or french croissants. The oils or fats can be of vegetal or animal origin, for example butter fat or margarine. The flour can be of any type used in the bakery area. The presence of water binding agents, salt and/or sugar is useful for decreasing the water activity aw of the dough and for limiting the development of the natural microflora of the dough system.

Under substantially oxygen-free atmosphere, we understand an atmosphere with less than 1.5% oxygen, this atmosphere being nitrogen and carbon dioxide alone or in combination. The content of these gases can vary widely between 0 and 100%. For gases, the percentages are in volume. The fact of having a combination substantially oxygen-free is critical: this allows the possibility of having a long shelf-life and also to maintain a good texture of the dough after several weeks.

The dough in the packaging can be either in the form of blocks or in the form of rolled pieces ready to use for example as mentioned in European Patent Application No. 0158590.

For reasons of convenience for the consumer, it is preferred that the dough is protected with a cardboard. The type of cardboard is not critical, but must be a material compatible in the food area. The presence of this cardboard can also avoid a plugging of the one-way valve due to dough swelling. Also having the dough wrapped in a paper (separation paper, baking paper or other type of paper) can avoid any risk of plugging the one-way valve. Finally, it is preferred to have the one-way valve sufficiently spaced from said dough.

The invention further concerns a process for the preparation of the above mentioned combination wherein the dough is prepared by mixing a live yeast with at least water and flour, the dough is rolled or put into pieces and disposed in a packaging system, the one-way valve is applied on the packaging, the packaging is evacuated, gasflushed and sealed.

As already said above, we can use any yeast either in dry or in wet form, with the above mentioned concentrations.

The water is normally used at a temperature of below 16° C., and it is preferred to use a part of the water in solid form, i.e. ice. The proportion of ice used is normally comprised between one and two parts of ice for six to ten parts of water.

The device used is a step-by-step device which will be explained in more detail in FIG. 6.

After the dough is put rolled or in pieces into the thermoformed packaging, the one-way valve is applied and the packaging is evacuated at a pressure between 0.07 and 0.01 bar. This step is necessary to evacuate the maximum of the oxygen, so that the content of this gas in the assembly is below 1.5%.

After the evacuation takes place, the gasflushing occurs with nitrogen and carbon dioxide alone or in combination. The amount of these gases introduced in the assembly is not critical, but it is preferably comprised between 40 and 80% of $CO_2$.

After the sealing of the combination, the different combinations are cut into separate pieces and brought at a temperature of less than 8° C. within a duration of less than 4 hours. This is necessary to guarantee a product having a shelf life at the above mentioned storage temperatures of at least 4 weeks.

The invention concerns further the dough which is kept under refrigeration. This dough contains between 43 and 62% of flour, between 5 and 23% fat, between ; 0.01 and 1% yeast, between 1.0 and 2.5% of sodium chloride or sugar, and between 23 and 33% of water.

The presence of sodium chloride or sugar is necessary for lowering the water activity. The flour used is already described above. The fat is a vegetable or animal fat, for example wheat gluten oil or margarine.

According to another embodiment, the dough contains furthermore between 0.5 and 1.5% of ethanol.

The invention relates finally to the system for the preparation of the combination of the invention comprising means for thermoforming the housing of the packaging, means for disposing the dough in the housing, means for delivering the top web with its one-way valve on the upper edge of the housing, means for gas flushing the inside of the packaging and sealing the top web on the upper edge and means for cutting each combination. As discussed above, the whole device operates in a step-by-step way.

BRIEF DESCRIPTION OF THE DRAWINGS

The description is now made in reference with the accompanying drawings, wherein

FIG. 5b is a section through the central part of the sheet of FIG. 5a.

DETAILED DESCRIPTION OF THE PREFERRED EMBODIMENTS

Figure 1:
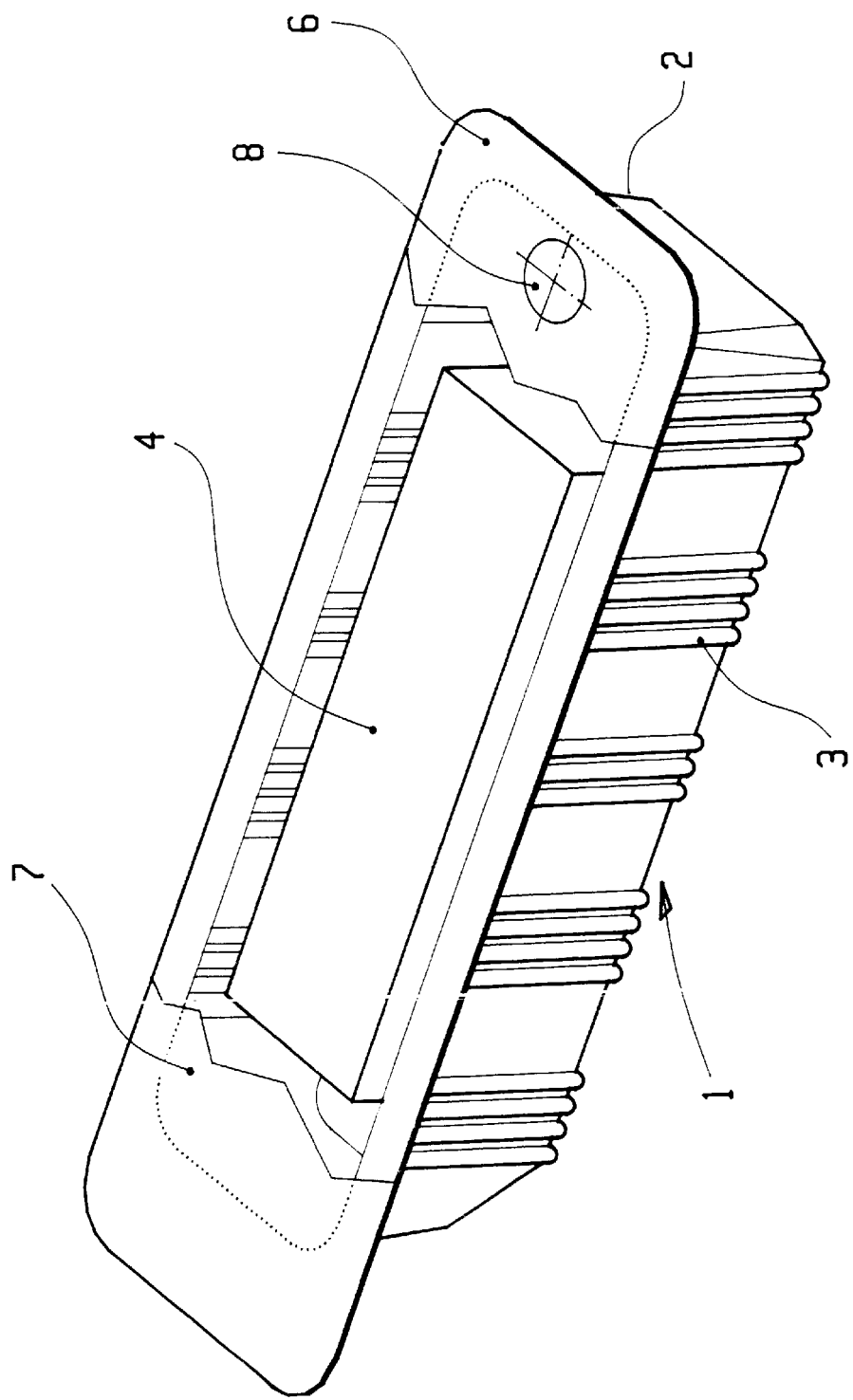
FIG. 1 is a perspective view of the assembly according to the invention.
Figure 2:
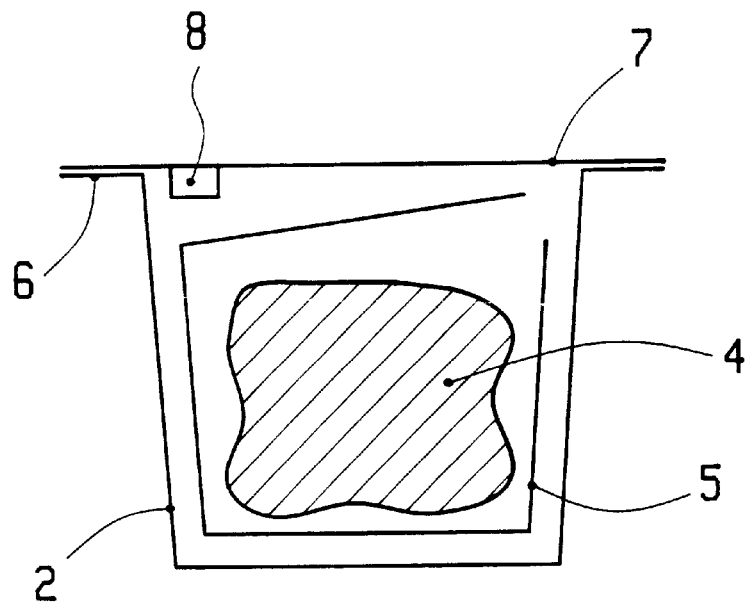
FIG. 2 is a schematic cross-sectional view of the FIG. 1.

The combination (1) comprises a thermoformed housing (2) obtained as a base web and presenting reinforcement ribs (3),permitting therefore to reduce further the thickness of the used material. In this case, we use as base web a composite sheet of PET/PE having a thickness of 600 microns. The base web presents a flange (6).

A piece of dough (4) prepared according to example 1 is placed on a cardboard (5) and disposed in the thermoformed base web (2). A top web (7) is sealed around the flange (6) of the base web. This top web comprises a one-way valve (8) authorizing the carbon dioxide which can be formed during the storage to escape for avoiding any swelling of the assembly and its explosion. This valve operates as soon as the inside pressure reaches between 3 to 7 mbar above the atmospheric pressure.

The atmosphere inside comprises less than 1.5% oxygen the ratio nitrogen carbon dioxide being of 50/50.

Normally, the valve is disposed such that a swelling of the dough avoids any risk of plugging of the valve.

Figure 3:
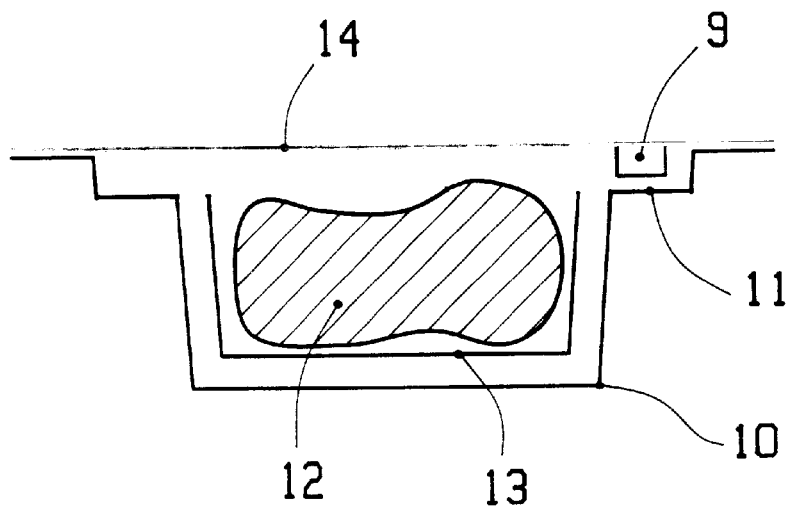
FIG. 3 is a schematic cross-sectional view of a second embodiment of the assembly according to the invention and FIG. 4a is a section through a Goglio valve and FIG. 4b is a schematic top view of the top web.

FIG. 3 shows an embodiment, wherein the valve (9) is disposed slightly on the side of the dough. In this case, the thermoformed base web (10) presents a shoulder (11) on the whole periphery, the dough (12) being also disposed in a cardboard (13). The valve (9) integral with the top web (14) is in regard with the shoulder (11), and if the dough would grow too much it is practically impossible that it reaches the valve (9). The material used is the same as for FIG. 1.

Figure 4A:
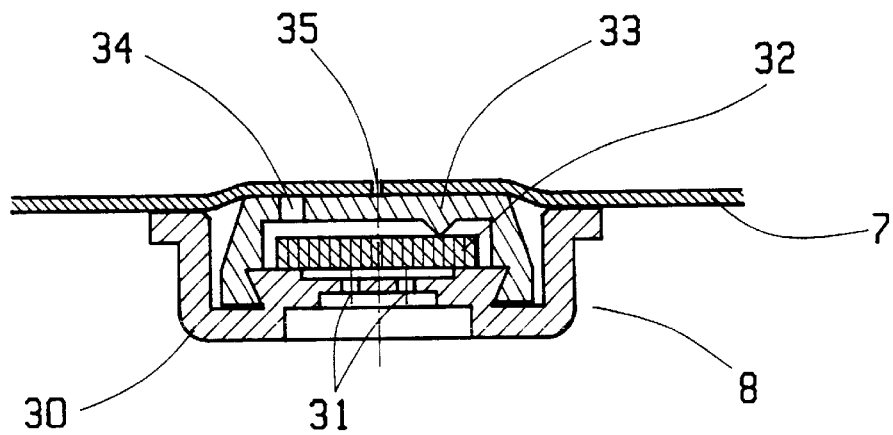

FIGS. 4a and b shows more precisely the top web (7) of FIG. 1 with the corresponding one-way valve (8): the valve is disposed on the inside of the packaging. This valve comprises a base plate (30) with holes (31), an elastic membrane disc (32) and a cap (33) with an air hole (34). The top web (7) is sealed in the concentric area A on the base plate (30) and presents a small cut (35) permitting the gas to escape. When the pressure increases inside of the packaging, the membrane disc (32) moves upward and CO2 escapes. When the pressure decreases the membrane disc (32) comes back as shown on FIG. 4a.

Figure 5A:
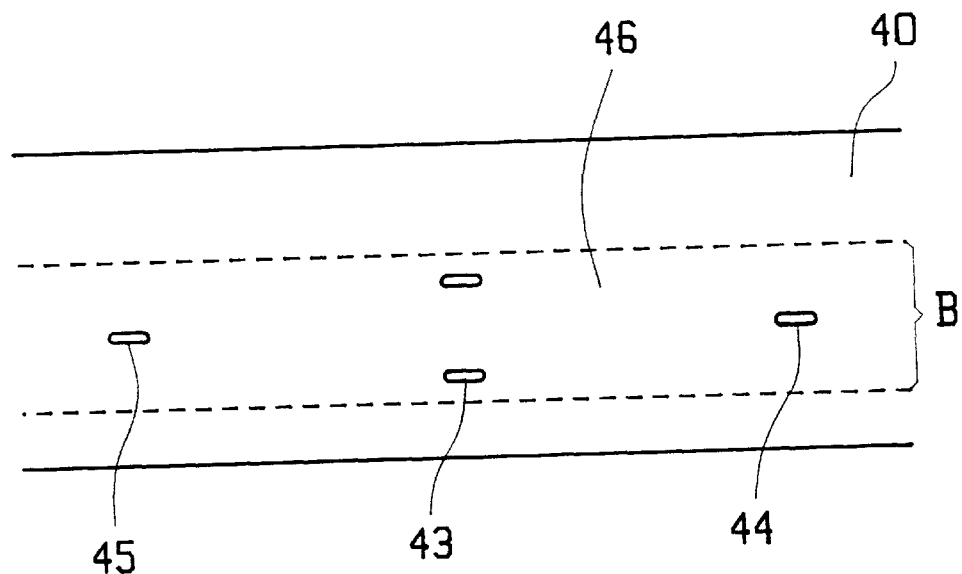
FIG. 5a is a schematic top view of a Rackmann valve.
Figure 5B:
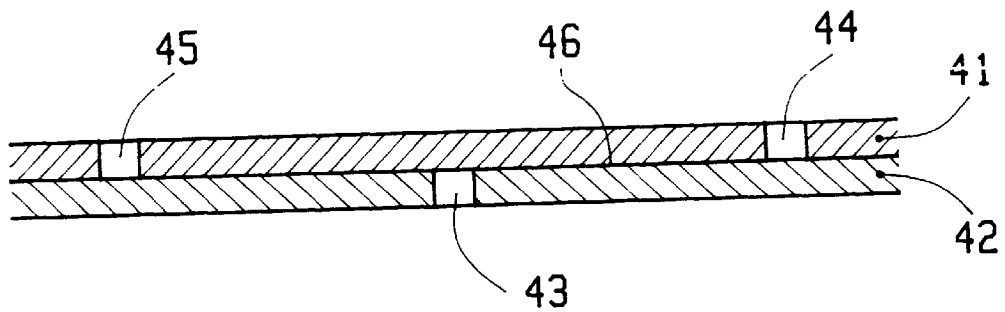

FIGS. 5a and b show the Raackmann valve. This valve is also disposed on the top web. The great advantage of this solution is that nothing is to be seen on the packaging, the top web forming the valve. The top web (40) is formed with a two-layer laminate (41, 42). In the part B (FIG. 5a), the two layers are not bonded and a channel (46) is formed allowing the gas to escape. The two layers (41, 42) are stuck together in area B with silicon oil. By puncturing the inner layer (42), holes (43) are formed and corresponding holes (44, 45) on the outer layer (41) are also made, allowing the top part of the laminate to rise and let the gas out through the channel (4 6).

Figure 6:
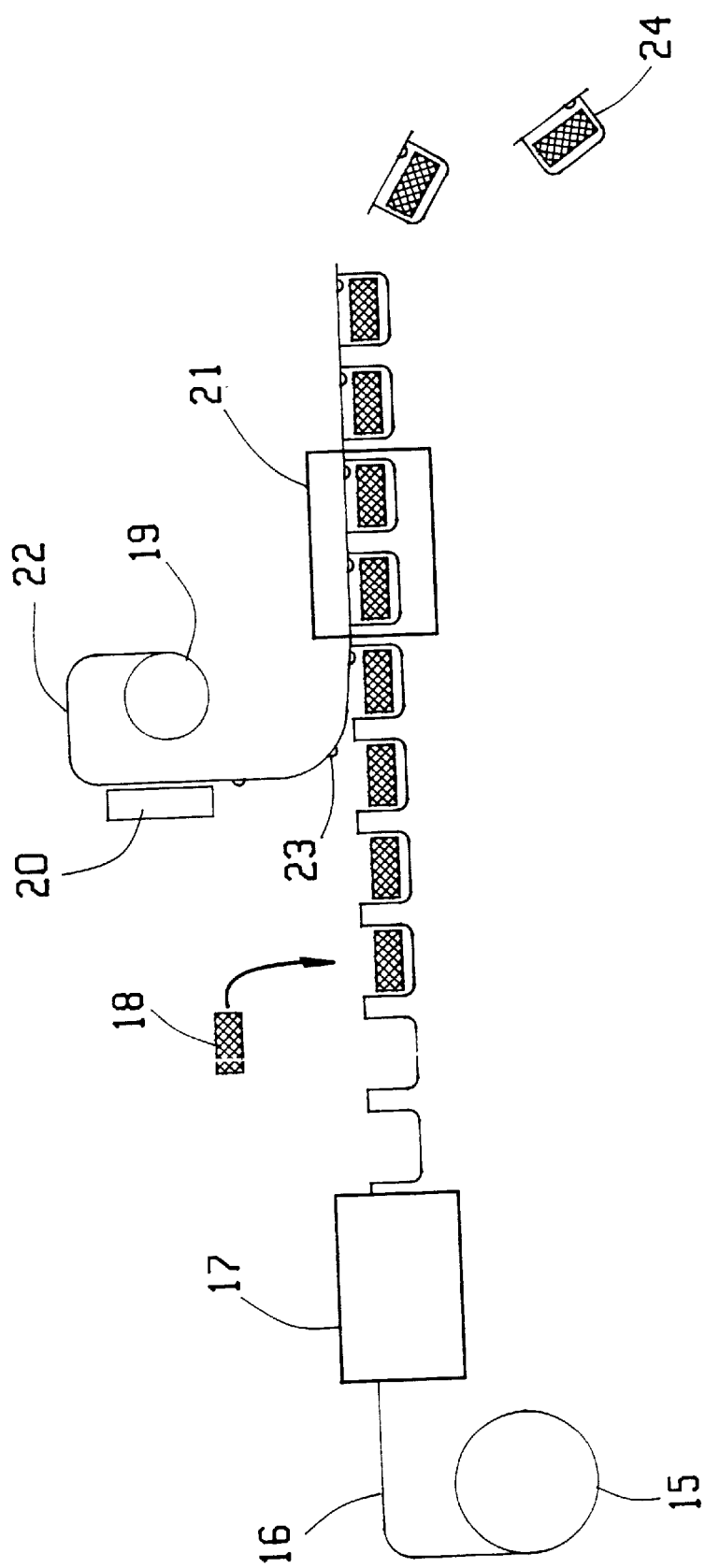
FIG. 6 is a schematic view of the operative device for manufacturing the assembly of FIG. 1.

FIG. 6 gives a schematic representation for manufacturing the combination. A reel (15) of thermoformable material (16) supplies with a step-by-step system a thermoforming device(17): this thermoforming occurs by heating and vacuum forming as known in the art. After the cooling of the base web, a piece of dough (18) is disposed in the formed cavity. A reel (19) for the top web (22) supplies a device (20) for the application of the one-way valve (23) after the valve is disposed on the top web, this latter enters a closed device (21) where the sealing of the top web takes place. This sealing occurs first by evacuating with a vacuum device, such as a vacuum pump (not shown) all the oxygen of the system. After this step, the assembly is gasflushed with nitrogen and carbon dioxide at a ratio of 50/50 and finally sealed at a temperature of approximately 150° C. When the finished assembly exits enclosure (21), we cut into individual pieces (24), which have then to be cooled as quickly as possible.

According to the invention, it is possible to produce continuously a yeast-based dough to be kept under frigeration for at least 28 days.

EXAMPLES

The following examples are intended to illustrate the present invention.

Example 1

The lti baker's yeast NCIMB 40612, deposited on Jan. 28, 1994 according to the Budapest Agreement at the National Collection of Industrial and Marine Bacteria Ltd. (NCIMB), P.O. Box 31, 135 Abbey Road, Aberdeen AB9 8DG, Great Britain is mixed in an amount of 0.1% (dry matter) with 60% of flour, 30% of water, 8% of margarine and 1.8% NaCl.

Figure 4B:
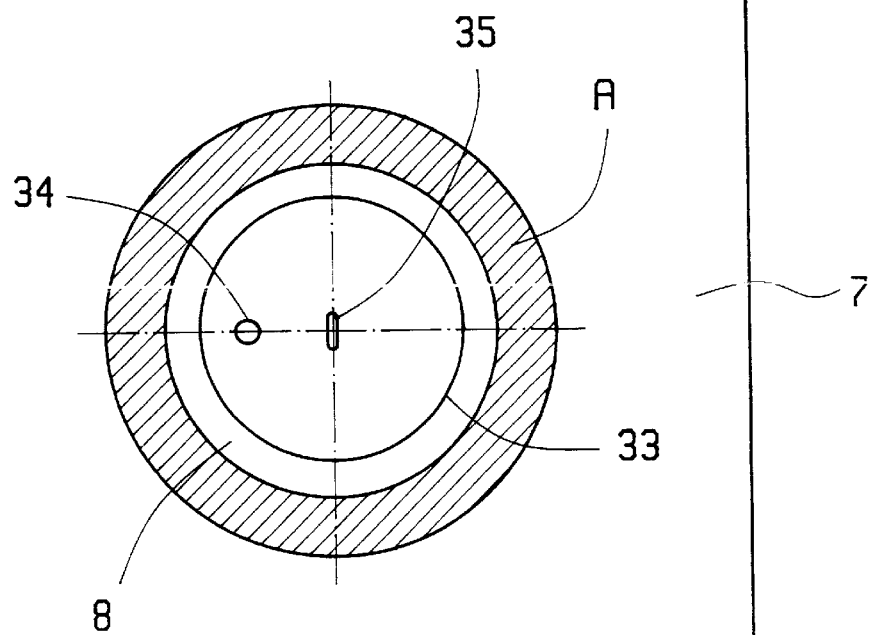

After kneading during several minutes, the dough is cut into pieces of 260 g and disposed in a packaging according to FIG. 1, said packaging being sealed in the manufacturing line according to FIG. 4. The atmosphere of the assembly contains 50% CO2 and 50% N2.

This dough is stored under refrigeration of about 8° C. during 4 weeks. It is then directly baked at 250° C. during 10–15 minutes.

The baked dough has a taste and a texture very near to that of a dough which has been leavened with baker's yeasts according to a classical method.

Example 2

0.1% of the same yeast as in example 1 is mixed with 60.5% of flour, 6.3% of vegetable fat, 1.8% of NaCl, 1% of ethanol and 30.2% of water.

The same packaging as in example 1 is used and the dough is stored during 4 weeks at about 8° C.

The presence of the valve in the assembly avoids any swelling of said assembly and the baked dough has similar properties (crispness, texture, taste) as a dough prepared according to classical procedure.

Example 3

0.02% of an ordinary commercial baker's yeast is mixed with 60.5% of flour, 6.3% of vegetable fat, 1.8% of NaCl, 1% of ethanol and 30.2% of water.

After kneading, the dough is disposed in the assembly according to the invention and sealed.

The presence of the valve in the assembly avoids any swelling of said assembly and the baked dough has similar properties (crispness, texture, taste) as a dough prepared according to classical procedure.

Example 4

0.1% of LTI baker's yeast is mixed with 44.0% flour, 26.7% vegetable/animal margarine/butter, 1.6% NaCl, 2.1% sucrose, 1.0% ethanol, 140 ppm ascorbic acid (based on flour) and 24.5% water (11% being ice-water).

After mixing, the dough is divided, laminated, sheeted, cut, rolled, packed and chilled.

The dough is stored at a max. temperature of 8° C. for at least 4 weeks. After rolling into croissants, it is baked in a conventional oven at 200° C. for 20–25 minutes and gives a product with good properties of crispiness, texture and taste.

Example 5

By replacing in the preceding example the LTI yeast by 0.02% of an ordinary baker's yeast, croissants with the same properties as above are obtained.

What is claimed is:

1. The combination of dough product based on a low temperature inactive living yeast which generates gas over time, the dough product containing between 43 and 62% of flour, between 5 and 23% fat, between 0.01 and 1% of a low temperature inactive strain yeast that is essentially inactive at temperatures up to 8–12° C., between 1.0 and 2.5% of sodium chloride or sugar, and between 23 and 33% water, and a closed packaging system containing said dough product, said packaging system comprising a housing of a material which is essentially impervious to oxygen, valve means operatively associated with the housing for allowing exit of gas from the housing when the gas pressure exceeds a certain minimum value and which closes when said gas pressure drops below the minimum value to prevent entry of oxygen into the housing, and a substantially oxygen-free gaseous atmosphere surrounding the dough product and additional to any gases generated by said living yeast.

2. The combination according to claim 1, characterized in that the packaging is one of a thermoformed or a flow pack system.

3. The combination according to claim 2, characterized in that the thermoformed packaging is made of a material selected from one of the following composite sheets: PET/PE, PP/EVOH/PE or PVC/PE.

4. The combination according to claim 3, characterized in that the packaging material has a thickness of between 75 and 1000 microns.

5. The combination according to claim 1, characterized in that the substantially oxygen-free atmosphere comprises nitrogen and carbon dioxide alone or in combination, with the content of oxygen in the packaging being less than 1.5%.

6. The combination according to claim 1, characterized in that the one-way valve is of the Goglio type or the Raackmann type.

7. The combination according to claim 1, characterized in that the dough product contains between 0.5 and 1.5% of ethanol.

8. The combination according to claim 1, wherein the packaging system further comprises a valve protection member of paper or cardboard which is placed adjacent the dough product and in the housing in a position between the dough product and the valve means to prevent plugging of the valve means as the dough product expands.

* * * * *